Figure 1:
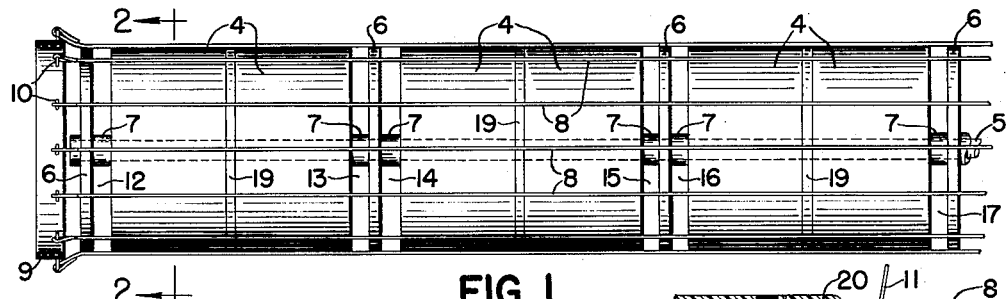

July 4, 1961

G. MATKOVICH 2,991,210

METHOD OF MAKING A REINFORCED PLASTIC
VESSEL WITH AN INTEGRAL HEAD

Filed July 16, 1959

INVENTOR.
GEORGE MATKOVICH

BY *Andrus & Starke*

Attorneys

United States Patent Office 2,991,210
Patented July 4, 1961

2,991,210
METHOD OF MAKING A REINFORCED PLASTIC VESSEL WITH AN INTEGRAL HEAD
George Matkovich, Milwaukee, Wis., assignor to A. O. Smith Corporation, Milwaukee, Wis., a corporation of New York
Filed July 16, 1959, Ser. No. 827,646
9 Claims. (Cl. 154—83)

This invention relates to a method of fabricating reinforced plastic articles and more particularly to a method of fabricating a reinforced plastic vessel with an integral head.

Reinforced plastic vessels are used in many applications where corrosion resistance and light weight are prime factors. A reinforced plastic vessel is generally fabricated by winding or laying up a generally cylindrical shell and then attaching preformed heads to the ends of the shell.

The present invention is directed to a method of fabricating a reinforced plastic vessel having an integral reinforced head in a continuous winding operation. More specifically, a mandrel and a generally circular disc are secured in spaced relation to a rotatable shaft to provide a slot therebetween, and a series of reinforcing strands are disposed longitudinally in circumferentially spaced relation over the peripheral surface of the mandrel and the disc and extend across the slot.

A second reinforcing strand impregnated with a binding material is wound circumferentially in the slot between the disc and the mandrel and the circumferential strand draws the loosely disposed longitudinal strands into the slot so that the original longitudinal strands extend radially within the clearance. The second strand is wound within the slot until the windings are flush with the outer surface of the mandrel to form the head of the vessel, and the strand is then wound in a generally helical or circumferential pattern over the outer surface of the mandrel to form the vessel wall. The loosely disposed longitudinal strands which initially bridged the slot, were drawn into the slot by the helical windings and serve to reinforce both the head and the vessel wall.

The method of the invention is a simple and inexpensive procedure for fabricating a reinforced plastic vessel with an integral reinforced head in a continuous winding operation. The longitudinal reinforcement is embedded within the head and also extends axially within the side wall of the vessel to add strength and rigidity to both the head and the shell.

As the head and shell are formed integrally in a single operation, the present process substantially reduces the time and labor in fabricating a plastic vessel. The steps of separately molding or fabricating a head and then bonding or securing the head within an end of the shell are eliminated by the present operation in which the head and shell are formed in a single winding operation.

Other objects and advantages will appear in the course of the following description.

The drawings illustrate the best mode presently contemplated of carrying out the invention.

Figure 2:
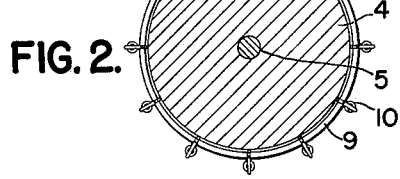
Figure 4:
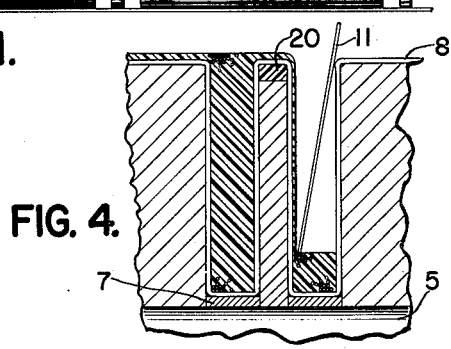
Figure 3:
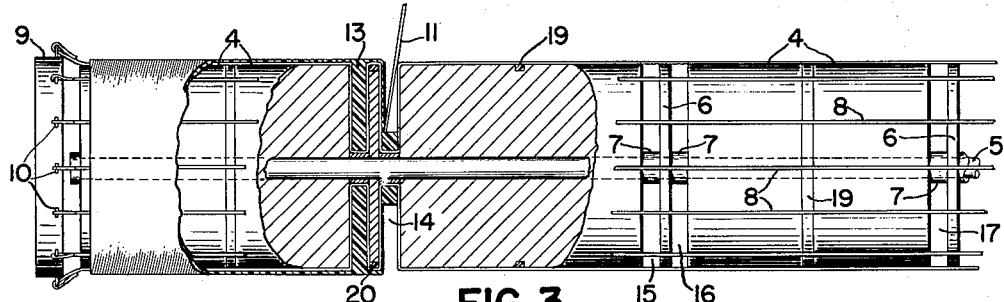
Figure 5:
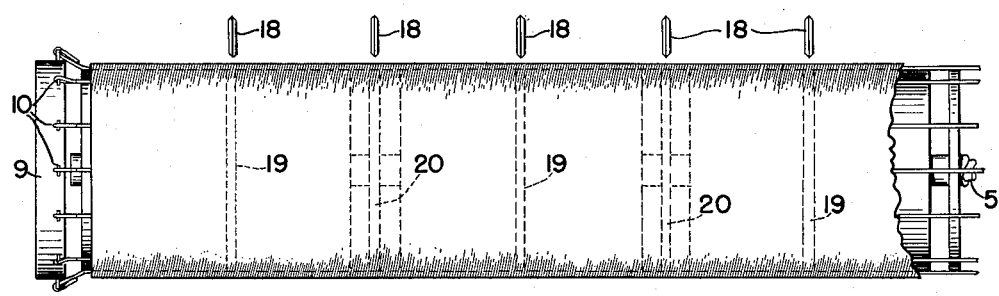
Figure 6:
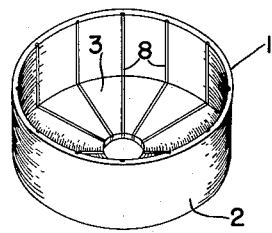

In the drawings:
FIGURE 1 is a side elevation of the mandrel with the series of longitudinal strands disposed over the periphery of the mandrel;
FIG. 2 is a transverse section taken along line 2—2 of FIGURE 1;
FIG. 3 is a view similar to FIGURE 1 with parts broken away in section showing the helical strand wound over one of the mandrel sections and disposed within the slot between the mandrel and the disc;
FIG. 4 is an enlarged fragmentary view showing the longitudinal strands drawn within the slot between the mandrel and the disc and the circumferential fibers disposed within the clearance;
FIG. 5 is a view similar to FIG. 3 after completion of the helical winding and showing the operation of cutting the completed tubular structure into a series of vessels; and
FIG. 6 is a view of the vessel formed by the method of the invention.

The drawings illustrate a continuous winding method for fabricating a reinforced plastic vessel 1 having a generally cylindrical wall or shell 2 and an integral formed head 3. The apparatus for producing the vessel includes a series of generally cylindrical mandrel sections 4 which are secured in spaced relation to a shaft 5. A series of discs 6 are disposed between the mandrel sections and are spaced from the corresponding ends of the mandrel sections by a series of spacer sleeves 7.

In fabricating the vessel, a plurality of longitudinal, flexible reinforcing members or strands are initially disposed in circumferentially spaced relation over the periphery of the mandrel sections. The strands 8 are positioned on the mandrel sections and maintained in alignment by means of an aligning ring 9 which is provided with a series of eyelets 10 or openings to which the individual strands are connected. The ring 9 is movable longitudinally with respect to the mandrel section and serves to draw the strands over the mandrel sections from a series of creels, not shown, and maintains the strands in the proper circumferentially spaced relation.

The strands 8 may be in the form of yarn or roving composed of long, substantially continuous fibers, strips of braided or woven fibrous material, strips of haphazardly arranged fibers, thin flexible metal wire or the like. The fibrous material may be formed of refractory fibers, such as glass, ceramic or mineral fibers; synthetic fibers, such as nylon, Orlon (a polymer of acrylonitrile), rayon or the like; or animal or vegetable fibers.

After the longitudinal strands 8 have been applied to the mandrel sections, a reinforcing strand 11 impregnated with a binding material, such as an uncured thermosetting resin, is wound within the slot 12 between the end of the first disc 6 in the series and the end of the corresponding mandrel section 4. The circumferential strand 11 serves to pull the slack longitudinal strands 8 from the creels so that the longitudinal strands are drawn radially inward within the slot, as shown in FIG. 3. The winding of strand 11 is continued within the slot 12 until the strand is substantially flush with the outer surface of the mandrel. The winding of the strand 11 within the slot 12 serves to form the head 3 of the vessel and the longitudinal strands 8 which extends radially within the slot 12, serve to reinforce the head.

The strand 11 is formed of a material such as that set forth for strands 8. The binding material used to impregnate the strand 11 may be any of the conventional thermosetting resins generally used for laminates and the like. The resin may include epoxides, polyesters, ureas, melamines and the like, and the resin may be applied to the strand 11 and also to the strands 8, if desired, by brushing, dipping, spraying, etc.

After the strand 11 has been wound substantially flush with the periphery of the mandrel, the strand 11 is then wound in a generally helical or circumferential pattern over the peripheral surface of the mandrel to form the shell or wall 2 of the vessel. The strand 11 is wound over the longitudinal strands 8 so that the longitudinal strands extend axially of the wall 2 and serve to reinforce the same.

The winding of the strand 11 on the peripheral surface of the mandrel 4 is continued until the wall 2 has been built up to the desired thickness to provide the vessel with the physical properties required for service.

After the winding on the peripheral surface of the first mandrel section is completed, the strand 11 is then wound in the slot 13 between the opposite end of the mandrel section and the corresponding disc. As in the case of the winding in the first slot 12, the strand 11 serves to draw the longitudinal strands from the creel into the slot and provide radially extending reinforcement for the head. After the winding in slot 13 is flush with the outer surface of the mandrel section, the strand 11 is wound within the next slot 14 and when the winding within the slot 14 is flush with the periphery of the mandrel, the winding is continued over the periphery of the next mandrel section as previously described. This winding is continued in a similar manner until the strand 11 has been wound within slots 15, 16, and 17, and over the periphery of the entire series of mandrel sections 4.

After the winding has been completed, the mandrel sections and the strands wound thereon are heated to cure the resin and form a strong rigid article. The resulting tubular article is cut or severed into a series of open ended vessels or tanks 1 by a series of cutting blades 18. Each mandrel section 4 is provided with a circumferential recess or groove which receives a band 19 of an expendable material, such as plastic or the like, and each disc is provided with an expendable rim 20. The cutting blades 18 are disposed in alignment with the bands 19 and rims 20 and cut through the tubular article into the respective bands and rims.

The blades 18 serve to cut the tubular article wound on each mandrel section 4 into two open ended vessels, as shown in FIG. 5. To remove the vessels 1 from the mandrel sections, the shaft 5 is removed from the openings within the mandrel sections 4 and discs 6 and the vessels 1 are then slipped from the respective mandrel sections. The central opening in the head 3 of each vessel formed by the shaft 5, can be enclosed by a suitable plug or the like.

As shown in FIG. 6, the longitudinal strands 8, which were drawn within the slots between the disc and the mandrel section, extend radially from the center of the head to the wall 2 and then extend axially within the wall. The strands 8 serve to reinforce both the head and the shell and tie these elements together as an integral structure.

As the longitudinal strands 8 are disposed loosely over the peripheral surface of the mandrel, the strands are automatically drawn into the slots by the tension on the circumferential strands 11 so that no additional operation is required to position the strands 8 in the vessel head and wall.

The present invention provides a simple and inexpensive method of providing a reinforced plastic vessel having an integral head in a continuous winding operation. As the head 3 is formed integrally with the shell 2, the present process eliminates the steps of separately molding the head and shell and then securing or bonding the head within an end of the shell.

Various modes of carrying out the invention are contemplated as being within the scope of the following claims particularly pointing out and distinctly claiming the subject matter which is regarded as the invention.

I claim:

1. In a method of fabricating a reinforced plastic vessel with an integral head, the steps of loosely disposing a series of flexible reinforcing members longitudinally over the outer surface of a mandrel, said mandrel having at least one circumferentially extending recess and said flexible members extending across said recess, winding a strand in a generally circumferential pattern on the outer surface of said mandrel to form the wall of the vessel and winding said strand into said recess to draw the flexible members therein, and continuing the winding of said strand until the winding in said recess is substantially flush with said wall and said winding within said recess constituting the head of the vessel, said flexible members extending generally radially within the head and axially within the wall to reinforce the head and the wall of the vessel.

2. A method of fabricating a reinforced plastic vessel with an integral head, comprising loosely disposing a first fibrous strand generally longitudinally over the outer surface of a mandrel, said mandrel having at least one circumferential extending recess and said fibrous strand extending across said recess, winding a second fibrous strand generally circumferentially on the outer surface of the mandrel to form the wall of the vessel and into said recess to draw said first fibrous strand therein, continuing the winding of said second strand within said recess until the second strand is substantially flush with the periphery of the mandrel to form the head of the vessel, said first fibrous strand extending generally radially within the head of the vessel and generally axially within the wall of the vessel to reinforce the same, impregnating said first and second strand with an uncured thermosetting resin, and curing the resin to form an integrally bonded rigid vessel having an integral head and shell.

3. A method of fabricating a reinforced plastic vessel with an integral head, comprising the steps of loosely disposing a series of first fibrous strands generally longitudinally over the outer surface of the mandrel in circumferentially spaced relation, said mandrel having at least one circumferential extending recess and said series of fibrous strands extending across said recess, forcing a portion of each of the fibrous strands generally radially to the bottom of said recess with a second portion of the strands remaining on the outer surface of the mandrel, winding a second fibrous strand generally circumferentially within said recess and over the first fibrous strand drawn therein and continuing the winding of the second fibrous strand within said recess until said second fibrous strand is substantially flush with the periphery of the mandrel to form the head of the vessel, winding said second strand on the outer surface of the mandrel to form the wall of the vessel, said first fibrous strands extending substantially radially within the head of the vessel and generally axially within the wall of the vessel to reinforce the same, impregnating said first fibrous strand and said second fibrous strand with an uncured thermosetting resin, and curing the resin to form a strong rigid article with an integral head and shell.

4. A method of fabricating a reinforced plastic vessel with an integral head, the steps of mounting a series of mandrels axially on a shaft in spaced relation, disposing a disc between the ends of adjacent mandrels in spaced relation to each end of the mandrel to provide a slot between the end of each mandrel and the corresponding disc, disposing a series of flexible reinforcing members over the peripheral surface of said series of mandrels with said reinforcing members extending across each of the slots and said reinforcing members being disposed for free longitudinal movement, winding a fibrous strand generally circumferentially within a first of the slots to thereby draw the reinforcing members within the slot and continuing the winding of said strand within the slot until the wound strand is substantially flush with the outer surface of the adjacent mandrel to form a head member, thereafter winding the strand on the outer surface to form the wall member, progressively repeating the winding of said strand within each slot and on the surface of each mandrel in said series to form a plurality of connected head members and wall members with said reinforcing members extending generally radially within said head members and axially within said wall members, impregnating the strand with an uncured thermosetting resin, curing the resin to form a rigid article, and severing the article intermediate the ends of the mandrel and at the location of each disc to form a series of open ended vessels having a side wall and an integral head.

5. In a method of fabricating a reinforced plastic vessel with an integral head, the steps of disposing a plurality of flexible reinforcing members over the outer surface of a mandrel with said mandrel having a slot extending around the entire periphery thereof and said reinforcing members being freely movable in the direction of the axis of said members, arranging said reinforcing members at an angle to said slot whereby said reinforcing members bridge said slot, winding a strand circumferentially within the slot to draw said reinforcing members into said slot and continuing the winding of said strand within the slot until said strand is substantially flush with the outer surface of the mandrel to form the head of the vessel, and subsequently winding the strand in a generally helical pattern over the outer surface of the mandrel to form the wall of the vessel, said flexible members extending generally radially within the head and axially within the wall of the vessel to reinforce the same.

6. In a method of fabricating a reinforced plastic vessel with an integral head, the steps of disposing a plurality of flexible reinforcing members over the outer surface of a mandrel with said mandrel having a slot extending around the entire periphery thereof and said reinforcing members being freely movable in the direction of the axis of said members, arranging said reinforcing members at an angle to said slot whereby said reinforcing members bridge said slot, winding a strand circumferentially within the slot to draw said reinforcing members into said slot and continuing the winding of said strand within the slot until said strand is substantially flush with the outer surface of the mandrel to form the head of the vessel, subsequently winding the strand in a generally helical pattern over the outer surface of the mandrel in a plurality of superimposed layers to form the wall of the vessel, said flexible members extending generally radially within the head and axially within the wall of the vessel to reinforce the same, coating said reinforcing members and said strand with a binding material to bond the reinforcing members and strang together as an integral structure, and removing the vessel from the mandrel.

7. The method of claim 4 in which both the flexible reinforcing members and the fibrous strand are composed of substantially continuous fibers.

8. In a method of fabricating a reinforced plastic vessel with an integral head, the steps of disposing a plurality of flexible reinforcing members over the outer surface of a mandrel with said mandrel having a slot extending around the entire periphery thereof and said reinforcing members being freely movable in the direction of the axis of said members, arranging said reinforcing members at an angle to said slot whereby said reinforcing members bridge said slot, winding a fibrous strand impregnated with an uncured thermosetting resin circumferentially within the slot to draw said reinforcing members into said slot and continuing the winding of said strand within the slot until said strand is substantially flush with the outer surface of the mandrel to form the head of the vessel, subsequently winding the strand in a generally helical pattern over the outer surface of the mandrel to form the wall of the vessel, said flexible members extending generally radially within the head and axially within the wall of the vessel to reinforce the same, and curing the resin to form a strong rigid structure.

9. In a method of fabricating a hollow article having a generally tubular wall and an inwardly extending radial portion, the steps of disposing a plurality of flexible reinforcing members over the outer surface of a mandrel with said mandrel having at least one circumferentially extending recess and said flexible members extending across said recess, winding a second flexible reinforcing member in a generally circumferential pattern on the outer surface of said mandrel to form the wall of the article and winding said second reinforcing member into the recess to draw the first reinforcing members therein, and continuing the winding of said second reinforcing member within the recess until the winding in said recess is substantially flush with said wall, the winding within said recess constituting an inwardly extending radial portion, said first flexible members being disposed generally radially within said radially extending portion and axially within the wall to reinforce said radially extending portion and the wall of the article.

References Cited in the file of this patent

UNITED STATES PATENTS

| | | |
|---|---|---|
| 2,594,693 | Smith | Apr. 29, 1952 |
| 2,723,705 | Collins | No. 15, 1955 |
| 2,837,456 | Parilla | June 3, 1958 |
| 2,862,541 | Brink | Dec. 2, 1958 |